United States Patent
Kim

(10) Patent No.: US 7,676,889 B2
(45) Date of Patent: Mar. 16, 2010

(54) HINGE DEVICE FOR PORTABLE TERMINAL

(75) Inventor: Do-Hun Kim, Gyeongsangbuk-do (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 784 days.

(21) Appl. No.: 11/448,672

(22) Filed: Jun. 8, 2006

(65) Prior Publication Data

US 2007/0039133 A1     Feb. 22, 2007

(30) Foreign Application Priority Data

Aug. 17, 2005   (KR) .................... 10-2005-0075289

(51) Int. Cl.
*E05D 11/10* (2006.01)
(52) U.S. Cl. ............... 16/330; 16/297; 16/303; 16/374; 361/679.27
(58) Field of Classification Search .............. 16/330, 16/303, 297, 334, 353, 284–285, 374–376; 379/433.13; 361/681, 679.27; 248/921–922; 455/575.3
See application file for complete search history.

(56) References Cited

U.S. PATENT DOCUMENTS

| | | | |
|---|---|---|---|
| 5,704,094 A * | 1/1998 | Hartigan et al. .............. 16/303 |
| 6,065,187 A * | 5/2000 | Mischenko .................. 16/341 |
| 6,115,886 A * | 9/2000 | Fujita ........................ 16/330 |
| 6,292,980 B1 * | 9/2001 | Yi et al. ....................... 16/303 |
| 7,171,247 B2 * | 1/2007 | Han ........................ 455/575.3 |
| 7,173,825 B2 * | 2/2007 | Han et al. .................... 361/725 |
| 7,383,618 B2 * | 6/2008 | Lu et al. ....................... 16/330 |
| 7,434,296 B2 * | 10/2008 | Kubota ....................... 16/330 |
| 2004/0137970 A1 * | 7/2004 | Han ........................ 455/575.3 |
| 2004/0142735 A1 | 7/2004 | Yi |
| 2004/0244147 A1 * | 12/2004 | Qin et al. ..................... 16/330 |
| 2005/0006212 A1 | 1/2005 | Han et al. |
| 2005/0128719 A1 | 6/2005 | Yamaguchi et al. |

FOREIGN PATENT DOCUMENTS

| | | |
|---|---|---|
| EP | 1530346 | 5/2005 |
| WO | WO 02/089343 | 11/2002 |

* cited by examiner

*Primary Examiner*—William L. Miller
(74) *Attorney, Agent, or Firm*—Roylance, Abrams, Berdo & Goodman, L.L.P.

(57) ABSTRACT

A hinge device for a portable terminal including a first housing, a second housing foldably coupled to the first housing is disclosed. The hinge device causes the first housing and the second housing to be rotatably coupled in such a manner that both housings are either rotated away from each other, or both housings are rotated close to each other. The hinge device includes a hinge shaft fixed to one of the first housing or the second housing. The hinge shaft has a first cam surface on one surface. A hinge cam is movably coupled on the other housing of the first housing and the second housing and has a second cam surface opposite to the first cam surface. An elastic member provides an elastic force in such a way as to cause the second cam surface to contact the first cam surface. The first cam surface has a first peak portion, and the second cam surface has a stopper groove. The first peak portion is engaged with the stopper groove when the second housing is opened with respect to the first housing between about 90° and 115°.

19 Claims, 6 Drawing Sheets

HINGE DEVICE FOR PORTABLE TERMINAL

CROSS-REFERENCE TO RELATED APPLICATION

This application claims the benefit under 35 U.S.C. § 119(a) of an application entitled "HINGE DEVICE FOR PORTABLE TERMINAL," filed in the Korean Industrial Property Office on Aug. 17, 2005 and assigned Ser. No. 2005-75289, the entire content of which is hereby incorporated by reference.

BACKGROUND OF THE INVENTION

1. Field of the Invention

The present invention relates to a portable terminal. More particularly, the present invention relates to a hinge device for a portable terminal.

2. Description of the Related Art

In general, a portable terminal is a device that provides a peer-to-peer wireless communication function or a client-to-server wireless communication function. Recently, in addition to voice communication service and short message transmission service, portable terminals provide various types of contents, including mobile banking service, television (TV) service, on-line gaming service, and video-on-demand (VOD) service to users.

Portable terminals may be classified, based on their external shapes, into bar-type terminals that include input/output devices (that is, a communication circuit, a transmitter, and a receiver) in a single housing, flip-type terminals that include a flip cover mounted on a bar-type terminal, folding-type terminals having a pair of housings that are opened or closed by pivoting and that include input and output devices that are separately disposed in each housing, and the like. Recently, there have been many attempts to meet the various needs of users while improving the portability and convenience with sliding-type terminals, as well as with folding-type terminals.

Initially, mobile communication services using such portable terminals were limited to services such as voice communication and short message transmission. Recently, however, mobile communication services have expanded to include other services, such as the transmission of game, music and video files, on-line game services and multimedia services.

The increased variety of services has produced significant changes in the functions and designs of terminals. For example, a camera lens assembly is currently incorporated into many portable terminals to allow users to take pictures. It is also expected that these camera lens assemblies will contribute to the commercialization of image communication services.

Folding-type terminals are currently in high demand in the portable terminal market. A conventional folding-type terminal includes a pair of housings which are pivotably coupled with each other by a hinge device. Such hinge devices are disclosed in various publications including U.S. Pat. No. 6,292,980, which is assigned to the assignee of the present invention, and which is hereby incorporated by reference in its entirety.

Recently, digital multimedia broadcasting service (referred to as 'DMB' hereinafter) using portable terminals has been commercialized. Conventional portable terminals, however, are designed to perform basic functions such as voice communication and message transmission, and conventional hinge devices are designed to position the housings of the portable terminal at angles which are convenient for those basic functions. Accordingly, to use the portable terminals to enjoy DMB service for extended periods of time, users must carry a separate support to hold the portable terminals open at a convenient angle. Additionally, existing portable terminals are inconvenient because users must hold the portable terminal so that the display device can be viewed.

Accordingly, there is a need for a portable terminal with an improved hinge device to allow convenient viewing of a display device.

SUMMARY OF THE INVENTION

An aspect of the present invention is to address at least the above problems and/or disadvantages and to provide at least the advantages described below. Accordingly, an aspect of the present invention is to provide a hinge device for a portable terminal, which permits a display device of the terminal to be viewed by a user with no need for a separate support to adjust the opening and closing angle of the terminal.

In accordance with an aspect of the present invention, a hinge device for a portable terminal that includes a first housing and a second housing coupled to the first housing is provided. The hinge device causes the first housing and the second housing to be rotatably coupled in such a manner that both housings can be opened (that is, positioned away from each other) or closed (that is, positioned near each other) with respect to each other. The hinge device includes a hinge shaft fixed to one of the first housing and the second housing. The hinge shaft has a first cam surface on one surface. A hinge cam is coupled to the other housing of the first housing and the second housing. The hinge cam is linearly movable, and a second cam surface is located opposite to the first cam surface on one surface of the hinge cam. An elastic member provides elastic force in such a way as to cause the second cam surface to contact the first cam surface. The first cam surface has a first peak portion, and the second cam surface has a stopper groove. The first peak portion is engaged with the stopper groove when the second housing is opened with respect to the first housing between about 90° and 115°.

BRIEF DESCRIPTION OF THE DRAWINGS

The above and other objects, features, and advantages of certain embodiments of the present invention will be more apparent from the following description taken in conjunction with the accompanying drawings, in which.

Throughout the drawings, the same drawing reference numerals will be understood to refer to the same elements, features, and structures.

DETAILED DESCRIPTION OF EXEMPLARY EMBODIMENTS

The matters defined in the description such as a detailed construction and elements are provided to assist in a comprehensive understanding of the embodiments of the invention. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
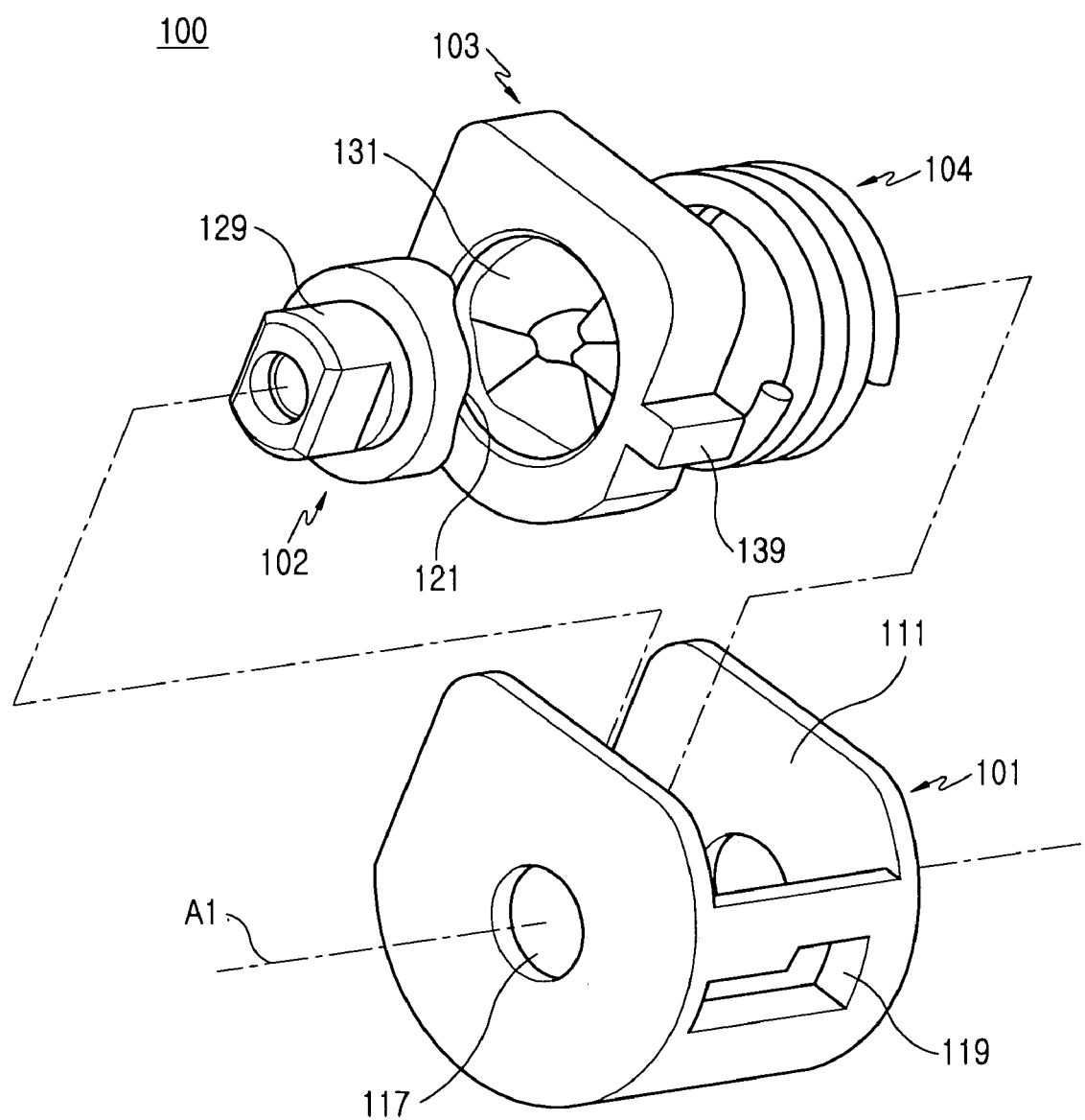
FIG. 1 is an exploded perspective view of a hinge device for a portable terminal according to an exemplary embodiment of the present invention.
Figure 2:
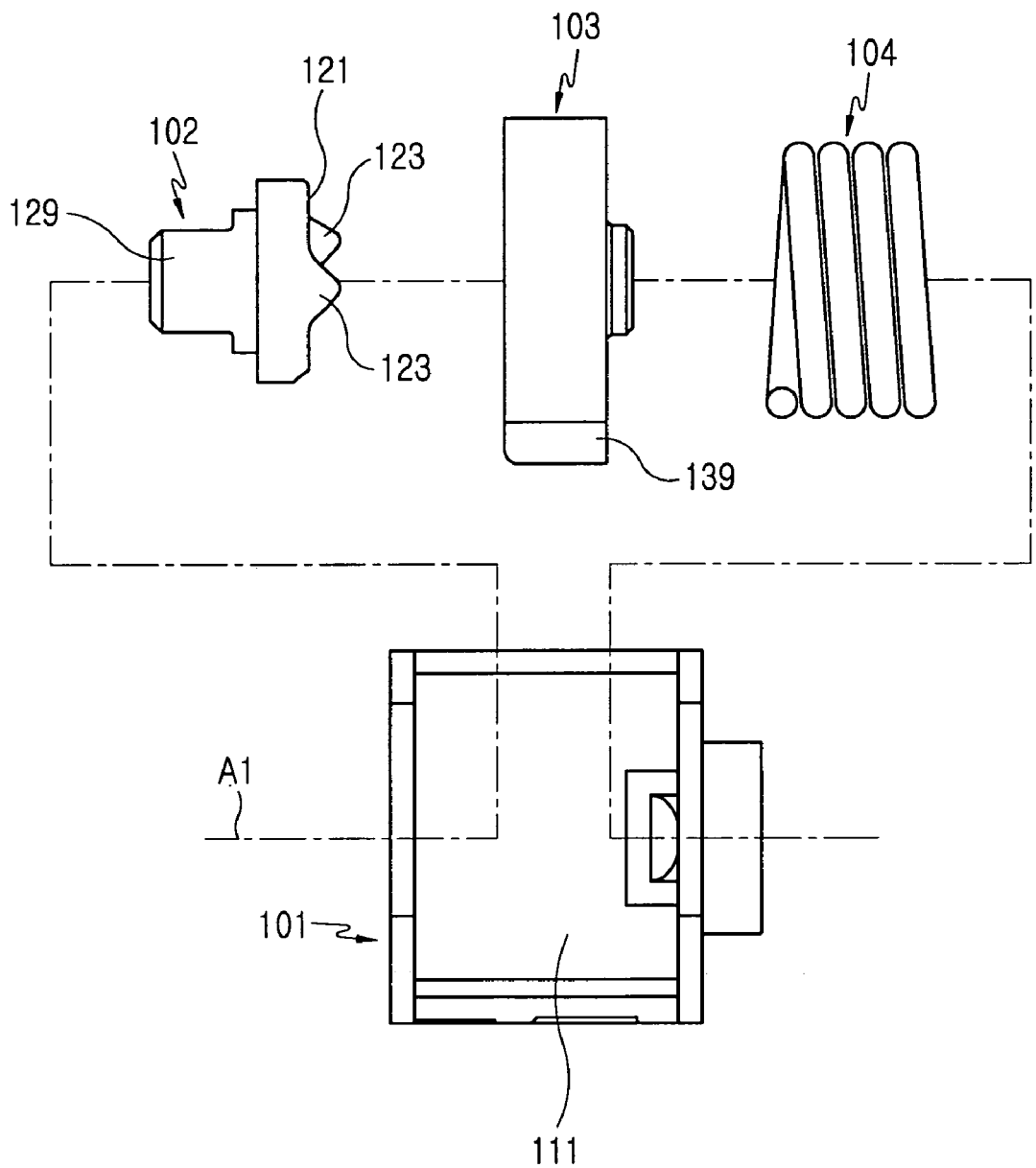
FIG. 2 is an exploded side view of the hinge device shown in FIG. 1.

FIGS. 1 and 2 show a hinge device 100 for a portable terminal according to an exemplary embodiment of the present invention. As shown in FIGS. 1 and 2, the hinge device 100 according to an exemplary embodiment of the present invention includes a hinge shaft 102, a hinge cam 103 and an elastic member 104. The hinge device 100 foldably couples a pair of housings forming a terminal to each other. Each of the hinge shaft 102, hinge cam 103, and the elastic member 104 is contained in a receiving space 111 of a hinge housing 101, thereby forming a single module. The hinge housing 101 may be formed integrally with any of the housings forming the terminal. Therefore, it is not necessary for the hinge device 100 to be equipped with a separate hinge housing, and each of the hinge shaft 102, hinge cam 103 and the elastic member 104 may be mounted directly to a housing forming the terminal.

The hinge shaft 102 has a first cam surface 121 on one surface and a hinge protrusion 129 on another surface. At least one peak portion (first peak portion) 123 protrudes from the first cam surface 121. The hinge protrusion 129 preferably has a plane on at least one part of its outer circumferential surface, so that it can be fixed to one of the housings forming the terminal. Additionally, a part of the hinge shaft 102, not including the hinge protrusion 129, is rotatably coupled to the other housing that forms the terminal. In brief, the pair of housings forming the terminal are foldably coupled to each other by the hinge shaft 102, and the housings are rotatably connected to the hinge shaft 102.

The hinge cam 103 is provided with a recess on the surface of the hinge cam that is opposite to the first cam surface 121. A second cam surface 131 is formed at the bottom of the recess. In other words, a part of the hinge shaft 102 is contained inside the hinge cam 103, and the first cam surface 121 and the second cam surface 131 face each other. The hinge cam 103 is contained inside the hinge housing 101, and is movable along a substantially straight line. A guide protrusion 139 for guiding such movement is formed on the outer circumferential surface of the hinge cam 103.

The elastic member 104 is contained in the hinge housing 101 and provides an elastic force in a direction that causes the hinge cam 103 to contact the hinge shaft 102. As the elastic member 104 provides elastic force, the hinge shaft 102 rotates about the hinge cam 103, so that the hinge device 100 generates rotational force. The rotational force generated by the hinge device 100 functions in such a way as to cause both housings to open or close with respect to each other. Such operation is realized according to the cam profile of the first cam surface 121 and the second cam surface 131, and will be explained in more detail later with reference to FIGS. 4 to 6.

The hinge housing 101 receives the hinge shaft 102, hinge cam 103 and the elastic member 103, in turn. A through hole 117 is formed at one end of the hinge housing 101 and the hinge protrusion 129 protrudes out of the through hole 117. Additionally, a guide hole 119 extends on the inner wall of the hinge housing 101 to receive the guide protrusion 130. Preferably, the guide protrusion extends longitudinally. The guide protrusion 139 is engaged with the guide hole 119 so as to guide linear movement of the hinge cam 103.

Figure 3:
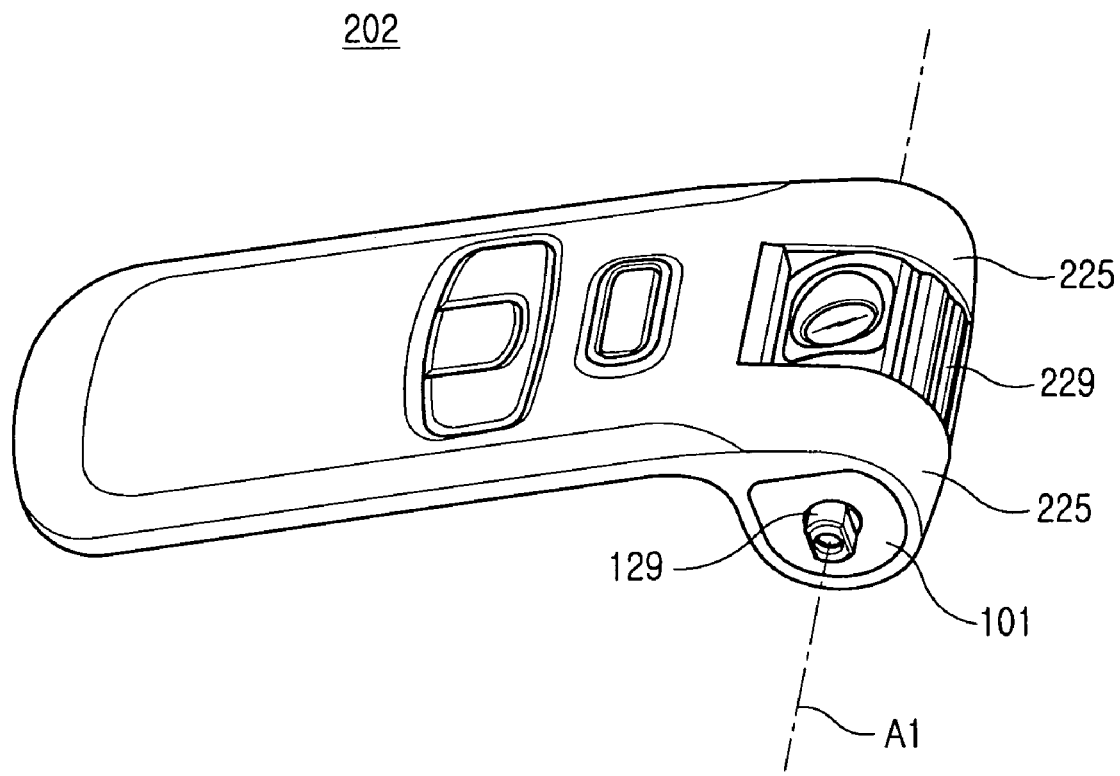
FIG. 3 is a perspective view of the hinge device shown in FIG. 1, which is coupled to the second housing of a portable terminal.
Figure 4:
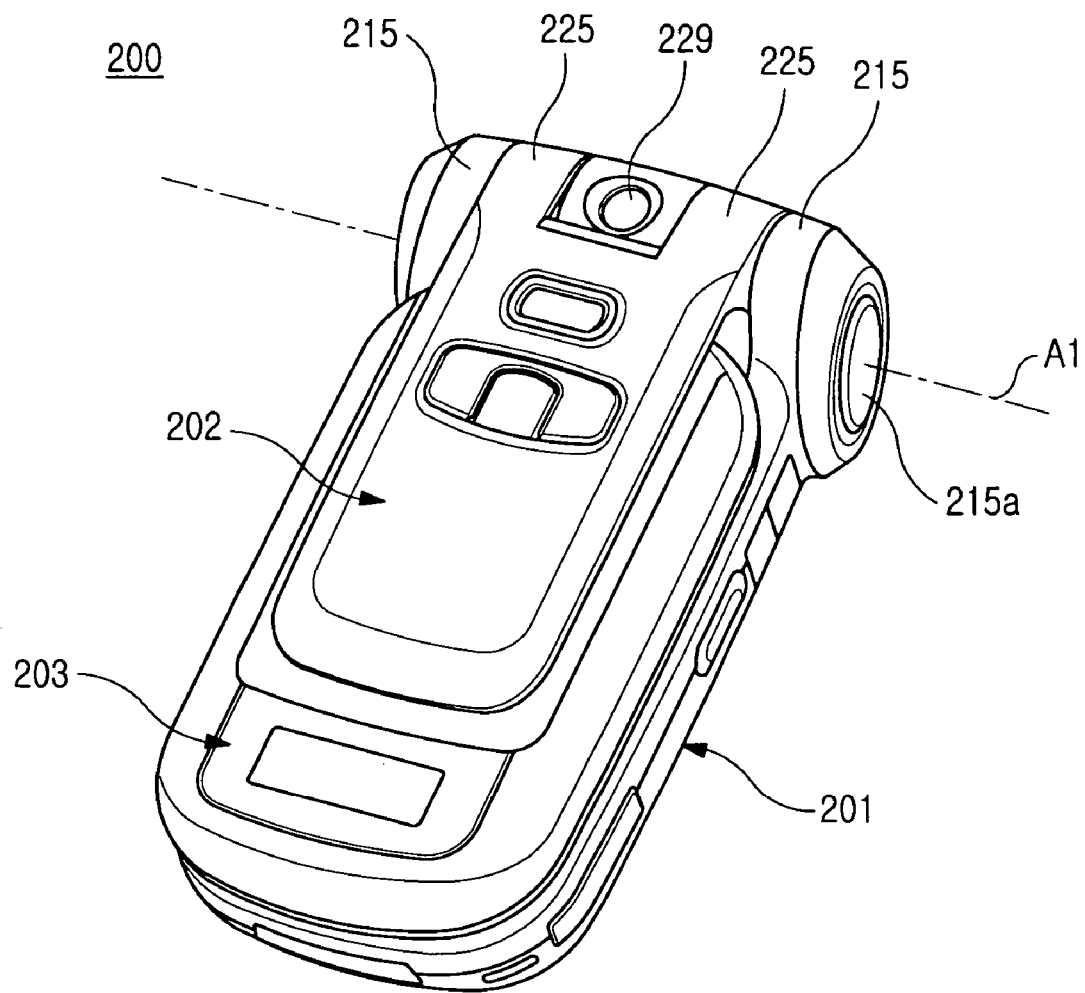
FIG. 4 is a perspective view of a portable terminal equipped with the hinge device shown in FIG. 1.
Figure 5:
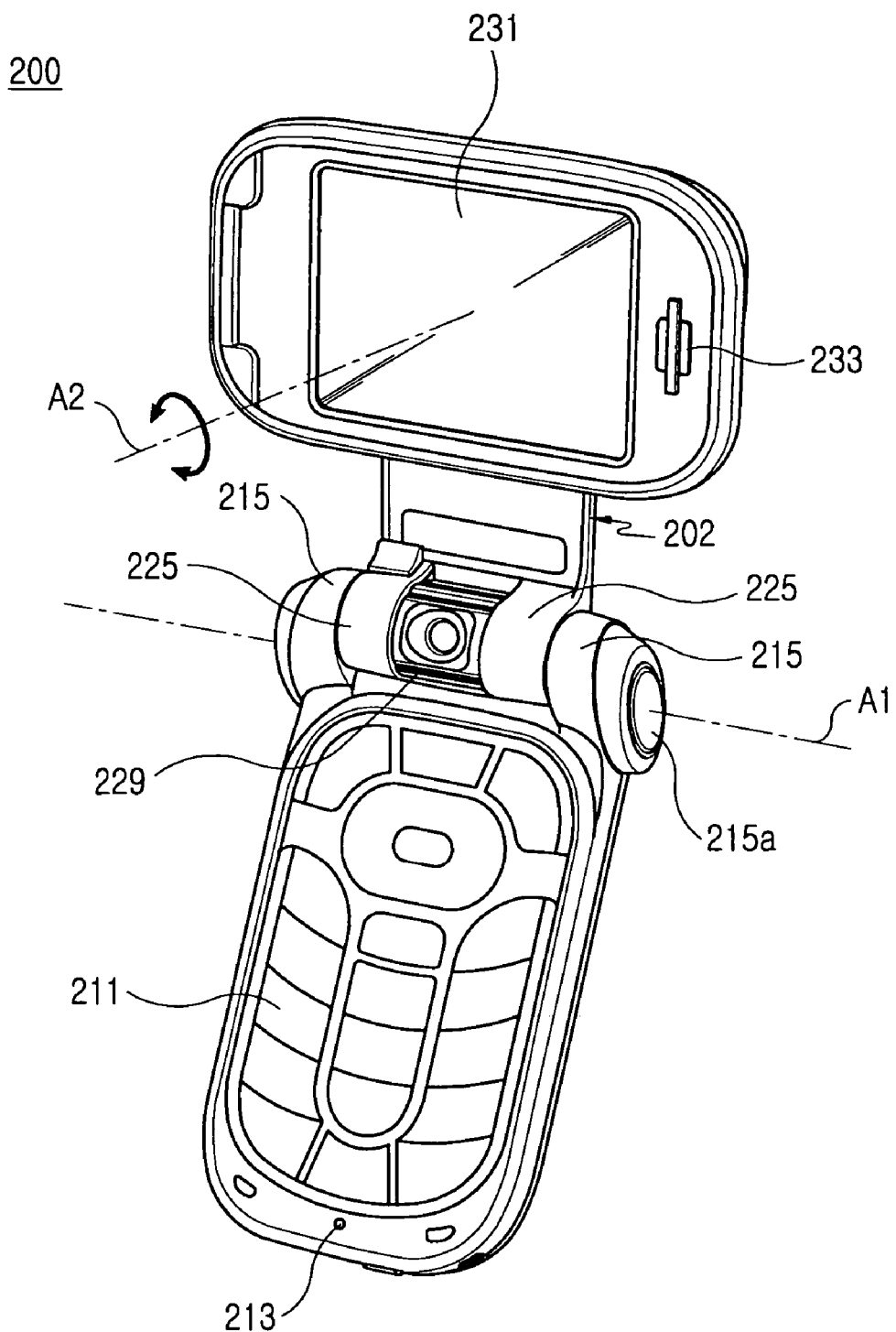
FIG. 5 is a perspective view showing the second housing and the third housing of the portable terminal shown in FIG. 4, after they rotate about the first hinge axis and the second hinge axis, respectively.

Referring to FIGS. 3 to 5, a portable terminal 200 having a pair of housings 201 and 202 coupled rotatably to each other by means of the hinge device 100, will be explained in more detail. The portable terminal 200 includes a first housing 201 and a second housing 202 which are foldably coupled to each other, and further includes a third housing 203 which is rotatably coupled to the second housing 202. As shown in FIG. 5, as the third housing 203 rotates about the second housing 202, a display device 231 is placed transversely, so that users can enjoy DMB service by utilizing the limited area of the display device efficiently.

The first housing 201 includes a keypad 211 and a transmitter 213 disposed on one surface of the first housing. As the second housing is folded onto the first housing 201 along with the third housing 203, the keypad 211 and the transmitter 213 are opened or closed. At each side of one end of the first housing 201, a side hinge arm 215 is formed. A speaker device 215a may be disposed on the outer surface of each side hinge arm 215.

The second housing 202 functions as a connection member for connecting the second housing 201 with the third housing 203. At one end of the second housing 202, a center hinge arm 225 is formed in such a manner that it is coupled rotatably between both side hinge arms 215, thereby forming a first hinge axis A1. Because the center hinge arm 225 is rotatably coupled between both side hinge arms 215, the second housing 202 is foldably coupled onto the first housing 201 along with the third housing 203. A camera lens 229 may also be mounted to the center hinge arm 225. The camera lens 229 can rotate about the first hinge axis A1 to permit taking pictures in multiple directions.

The third housing 203 includes a display device 231 and a receiver 233 on the inner surface of the third housing. Additionally, the outer surface of the third housing 203 is joined with the inner surface of the second housing 202 to form a second hinge axis A2. Therefore, as shown in FIG. 5, the third housing 203 rotates about the second hinge axis A2, so that the display device 231 can be placed transversely.

Meanwhile, it is also possible to mount a display device and receiver to the second housing 202 and to connect the second housing 202 with the first housing 201 with the hinge device 100, as in the case of a conventional folding-type terminal. However, because the hinge device according to the exemplary embodiments of the present invention is designed to provide a convenient portable terminal capable of DMB service, the terminal disclosed herein as an exemplary embodiment is a terminal capable of DMB service.

The hinge device 100 is contained in the center hinge arm 225. The hinge protrusion 129, protruding out of one end of the hinge housing 101, is fixed to the inner surface of the side hinge arm 215. Because the hinge shaft 102 rotates about the hinge housing 101, hinge cam 103 and the center hinge arm 225, the second housing 202 rotates about the first hinge axis A1 while being supported by the hinge shaft 102.

Meanwhile, although the hinge device 100 is coupled to the second housing 202 according to an exemplary embodiment of the present invention, one skilled in the art will understand that the hinge device 100 may be coupled to the first housing 201, while the hinge protrusion 129 may be fixed to one end of the center hinge arm 225.

Conventional hinge devices provide an elastic force to cause the second housing 202 and the third housing 203 to open and close with respect to the first housing 201. The hinge device 100 according to the exemplary embodiments of the present invention permits the second housing and the third housing 202 and 203 to be stopped at a desired angle partially between opened and closed positions.

Figure 6:
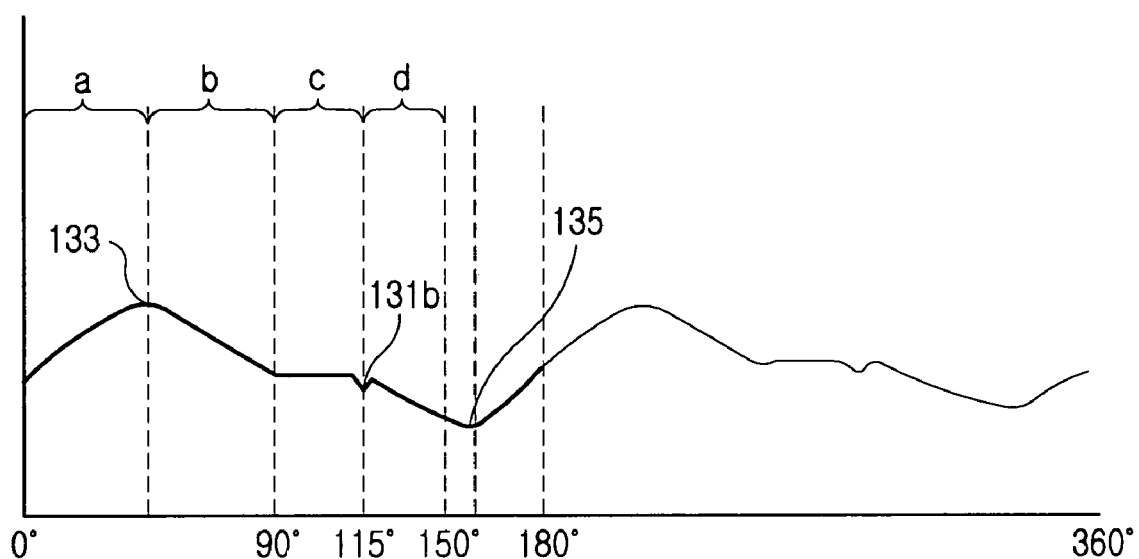
FIG. 6 is a cam profile of the hinge cam shown in FIG. 1.

FIG. 6 shows a cam profile 131a of the second cam surface 131. In the cam profile 131a, the horizontal axis is a rotation angle of the second housing 202 with respect to the first housing 201. Zero degrees (0°) represents the second housing 202 being completely closed (that is, completely folded on the first housing 201). The second housing 202 can be opened with respect to the first housing 201 to an angle of about 150°. When the second housing 202 rotates on the first housing 201, the hinge shaft 102, fixed to the first housing 201, rotates about the hinge cam 103. As the hinge shaft 102 rotates with respect to the hinge cam 103, the first peak portion 123 is in sliding contact with the second cam surface 131, and the opening angle of the second housing 202 is the same as the angle, at which point the first peak portion 123 is disposed on the second cam surface 131. In other words, when the second housing 202 is folded on the first housing 201, the first peak portion 123 is disposed on the second cam surface 131 at an angle of 0°.

The second cam surface 131 includes a second peak portion 133 having a first inclination zone (a) and a second inclination zone (b) between about 0° and about 90°, a free stop zone (c) between about 90° and 115°, and a third inclination zone (d) between about 115° and about 150°.

In the exemplary embodiment just described, the first inclination zone (a) begins at about 0° because the housing is fully closed at about 0°, and the third inclination zone (d) ends at about 150° because the housing is fully opened at about 150°. However, the first inclination zone (a) may extend anywhere from about 350° to about 0° and the third inclination zone (d) may extend anywhere from about 150° to about 170°. The additional inclination zones are provided to provide additional rotational force in the closed or opened position and provide additional stability.

The first inclination zone (a) and the second inclination zone (b) are connected with each other in such a manner that they form the second peak portion 133 on the second cam surface 131. The free stop zone (c) adjacent to the third inclination zone (d) has a stopper groove 131b at its end. Additionally, the third inclination zone (d) forms a valley portion 135 together with another inclination zone adjacent thereto.

The second peak portion 133, formed by the first inclination zone (a) and the second inclination zone (b), may be disposed at any position between about 0° and about 90°. In a conventional folding-type terminal, the second peak portion 133 is formed in a range of about 45° to about 60°, and provides rotational force in such a way as to cause the terminal to be closed at one side of the second peak portion 133, or to cause the terminal to be opened at the other side of the second peak portion 133. In the hinge device 100 according to an exemplary embodiment of the present invention, it is preferable that the second peak portion 133 is disposed at a position between about 30° and about 45°.

When the first peak portion 123 is disposed in the first inclination zone (a), the elastic force provided by the elastic member 104 causes the first peak portion 123 to move along the first inclination zone (a) to the position corresponding to 0°, wherein such elastic force functions as rotational force for rotating the hinge shaft 102. In other words, within the first inclination zone (a), the hinge device 100 generates a rotational force that functions in such a way as to cause the second housing 202 to close (that is, to be folded toward the first housing 201).

When the first peak portion 133 is disposed in the second inclination zone (b), the elastic force provided by the elastic member 104 causes the first peak portion 123 to move along the second inclination zone (b) to the position corresponding to 90°, wherein such elastic force functions as rotational force for rotating the hinge shaft 102. In other words, within the second inclination zone (b), the hinge device 100 generates a rotational force that functions in such a way as to cause the second housing 202 to open (that is, rotate away from the first housing 201).

In the free stop zone (c), the hinge device 100 does not generate rotational force. Additionally, frictional force, between the first peak portion 123 and the second cam surface 131 within the free stop zone (c), inhibits the second housing 202 from moving to a certain degree. Therefore, it is possible for users to locate the second housing 202 at any position within the free stop zone (c). Further, when the first peak portion 123 is engaged with the stopper groove 131b formed at one end of the free stop zone (c), the second housing 201 is stably maintained at an angle of about 115° with respect to the first housing 201.

When the second housing 202 is stopped at any position within the free stop zone (c) ranging from about 90° to about 115°, a user can enjoy DMB service by placing the first housing 201 on a table or the like and rotating the display device 231 in the transverse direction. Herein, because the second housing 202 is opened at an angle of about 90° to about 115° from the first housing 201, the terminal can be maintained stably on a table and images displayed on the display device 231 are within a user's view.

When a user rotates the second housing 202 to a position corresponding to an opening angle of about 115° or more, the first peak portion 123 is disposed in the third inclination zone (d). When the first peak portion 123 is disposed in the third inclination zone (d) as described above, the elastic force provided by the elastic member 104 causes the first peak portion 123 to move along the third inclination zone (d) to the position corresponding to about 150°, wherein such elastic force functions as rotational force for rotating the hinge shaft 102. In other words, within the third inclination zone (d), the hinge device 100 generates a rotational force that functions in such a way as to cause the second housing 202 to open (that is, rotate away from the first housing 201). The second housing 202 stops at a position corresponding to an opening angle of about 150° from the first housing 201.

When the second housing 202 is opened away from the first housing at an opening angle of about 150°, the terminal 200 can be used conveniently for general functions of portable terminals including voice communication and short message input/transmission.

As described above, because the hinge device for a portable terminal according to exemplary embodiment of the present invention can be applied to a folding-type terminal so that a second housing opened from a first housing can be stopped at any position within a range of about 90° to about 115°. Further, users can easily enjoy DMB service by placing the display device of the terminal in the transverse direction. Therefore, the terminal equipped with the hinge device according to the exemplary embodiments of the present invention is convenient to use, because it is not necessary for users to carry a separate portable support, or to hold the display device awkwardly in their hands so that the display device is within view, when users want to enjoy DMB service. Further even though the hinge device for a portable terminal according to exemplary embodiment of the present invention has a free stop zone which is formed in the range between about 90° and 115°, those skilled in the art can understand that the second inclination zone (b) can be extended to 115° and the stopper groove 131b is formed at the end of the second inclination zone (b).

While the invention has been shown and described with reference to certain embodiments thereof, it will be understood by those skilled in the art that various changes in form and details may be made therein without departing from the spirit and scope of the invention as defined by the appended claims.

What is claimed is:

1. A hinge device for a portable terminal including a first housing, a second housing foldably coupled to the first housing, and the hinge device causing the first housing and the second housing to be rotatably coupled to each other so that both housings may be positioned away from each other or close to each other, wherein the hinge device includes:
   a hinge shaft fixed to one of the first housing or the second housing, the hinge shaft having a first cam surface;
   a first peak portion protruding from the first cam surface;
   a hinge cam coupled to the other housing of the first housing and the second housing, the hinge cam being movable along a substantially straight line, the hinge cam having a recess provided on a surface thereof opposite to the first cam surface and a second cam surface formed at a bottom of the recess;
   a stopper groove recessed on the second cam surface; and
   an elastic member that provides an elastic force to cause the second cam surface to contact the first cam surface,
   wherein a part of the hinge shaft is contained in the recess, and the first peak portion is engaged with the stopper groove when the second housing is opened with respect to the first housing between about 90° and 115°.

2. A hinge device for a portable terminal as claimed in claim 1, wherein the second cam surface includes:
   a second peak portion;
   a valley portion; and
   a substantially planar free stop zone formed on a portion of a curved surface between the second peak portion and the valley portion,
   wherein the stopper groove is formed in the free stop zone.

3. A hinge device for a portable terminal as claimed in claim 2, wherein a part of the curved surface between the second peak portion and the valley portion is formed by the free stop zone and the stopper groove.

4. A hinge device for a portable terminal as claimed in claim 3, wherein the free stop zone is provided from a position corresponding to an opening angle of the second housing of about 90° from the first housing to a position corresponding to an opening angle of the second housing of about 115° from the first housing, and the peak portion of the first cam surface is engaged with the stopper groove when the opening angle of the second housing is about 115°.

5. A hinge device for a portable terminal as claimed in claim 3, wherein:
   the second peak portion is formed by a first inclination zone and a second inclination zone,
   the valley portion is formed by a third inclination zone, and
   the free stop zone is formed between the second inclination zone and the third inclination zone.

6. A hinge device for a portable terminal as claimed in claim 5, wherein when the first peak portion is disposed in the first inclination zone, the elastic force causes the second housing to be folded onto the first housing.

7. A hinge device for a portable terminal as claimed in claim 5, wherein the first peak portion is disposed in the first inclination zone, when the second housing is folded onto the first housing.

8. A hinge device for a portable terminal as claimed in claim 5, wherein when the first peak portion is disposed in the second inclination zone or the third inclination zone, the elastic force causes the second housing to rotate away from the first housing.

9. A hinge device for a portable terminal as claimed in claim 5, wherein the first peak portion is disposed in the third inclination zone, when the second housing is opened from the first housing at an angle of about 150°.

10. A hinge device for a portable terminal as claimed in claim 5, further comprising:
    a hinge housing formed on the housing which the hinge cam is coupled to; and
    a hinge protrusion formed on a surface of the hinge shaft,
    wherein the hinge shaft is rotatably contained in the hinge housing, and the hinge protrusion protrudes out from one end of the hinge housing to be fixed to the housing that the hinge shaft is fixed to.

11. A hinge device for a portable terminal as claimed in claim 10, wherein the hinge housing is integrally formed on the housing which the hinge cam is coupled to.

12. A hinge device for a portable terminal as claimed in claim 10, further comprising:
    a guide hole extending on inner wall of the hinge housing along a longitudinal direction; and
    a guide protrusion formed on an outer circumferential surface of the hinge cam and moving substantially linearly inside the guide hole,
    wherein the hinge cam is guided by the guide protrusion and the guide hole, so that it moves substantially linearly.

13. A hinge device for a portable terminal as claimed in claim 10, wherein the hinge shaft, hinge cam and the elastic member are contained in the hinge housing, in turn.

14. A hinge device for a portable terminal as claimed in claim 2, wherein the free stop zone is formed in the range of a position which the first peak portion is located on when the second housing is opened with respect to the first housing between about 90° and 115°.

15. A hinge device for a portable terminal as claimed in claim 1, further comprising:
    a pair of side hinge arms formed on the first housing; and
    a center hinge arm formed on the second housing and interposed rotatably between both side hinge arms,
    wherein the hinge shaft is fixed to one of the side hinge arms while being coupled rotatably to the center hinge arm.

16. A portable terminal, comprising:
    a first housing;
    a second housing; and
    a hinge device coupling the first housing and the second housing to each other, the hinge device comprising:
    a hinge shaft fixed to the first housing, the hinge shaft having a first cam surface;
    a first peak portion protruding from the first cam surface;
    a hinge cam movably coupled to the second housing, the hinge cam having a recess provided on a surface thereof opposite to the first cam surface and a second cam surface formed at a bottom of the recess, such that the hinge shaft is partially disposed inside the hinge cam; and
    an elastic member that biases the second cam surface into contact with the first cam surface;
    wherein the second cam surface has a substantially planar free-stop zone and a stopper groove formed at one end of the free-stop zone.

17. A portable terminal as claimed in claim 16, wherein the second cam surface includes a second peak portion and a valley portion with a curved surface therebetween.

18. A portable terminal as claimed in claim 17, wherein a part of the curved surface between the second peak portion and the valley portion is formed by the free stop zone and the stopper groove.

19. A portable terminal as claimed in claim 18, wherein
    the second peak portion is formed by a first inclination zone and a second inclination zone,
    the valley portion is formed by a third inclination zone, and
    the free stop zone is formed between the second inclination zone and the third inclination zone.

* * * * *